(12) United States Patent
Plant

(10) Patent No.: US 7,578,470 B2
(45) Date of Patent: Aug. 25, 2009

(54) PASSENGER SEATING ARRANGEMENT

(75) Inventor: Tommy George Plant, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/737,203

(22) Filed: Apr. 19, 2007

(65) Prior Publication Data

US 2007/0246981 A1 Oct. 25, 2007

Related U.S. Application Data

(60) Provisional application No. 60/745,338, filed on Apr. 21, 2006.

(51) Int. Cl.
*B64D 11/06* (2006.01)
(52) U.S. Cl. ............... 244/118.6; 297/232; 297/243
(58) Field of Classification Search ............ 297/232, 297/243, 249, 254.13; 244/118.5, 118.6
See application file for complete search history.

(56) References Cited

U.S. PATENT DOCUMENTS

| | | | |
|---|---|---|---|
| 2,414,730 A | | 1/1947 | Flogaus |
| 2,947,349 A | | 8/1960 | Kryter |
| 4,936,620 A | * | 6/1990 | Francois et al. ............. 296/64 |
| 5,177,616 A | * | 1/1993 | Riday ........................ 348/837 |
| 5,740,989 A | * | 4/1998 | Daines ..................... 244/118.6 |
| 5,795,025 A | | 8/1998 | Murphy |
| 5,954,401 A | | 9/1999 | Koch et al. |
| D421,948 S | | 3/2000 | Dryburgh et al. |
| 6,059,364 A | | 5/2000 | Dryburgh et al. |
| D439,063 S | | 3/2001 | Round et al. |
| 6,209,956 B1 | | 4/2001 | Dryburgh et al. |
| D443,990 S | | 6/2001 | Beroth |
| 6,276,635 B1 | | 8/2001 | Ferry et al. |
| 6,692,069 B2 | | 2/2004 | Beroth et al. |
| 6,742,842 B2 | * | 6/2004 | Dowty ................... 297/354.13 |

(Continued)

FOREIGN PATENT DOCUMENTS

EP 0869061 A2 10/1998

(Continued)

OTHER PUBLICATIONS

Letter from Jennifer Meredith of Meredith & Keyhani, PLLC, dated Apr. 23, 2009.

(Continued)

*Primary Examiner*—David Dunn
*Assistant Examiner*—Patrick Lynch
(74) *Attorney, Agent, or Firm*—Adams Intellectual Property Law, P.A.

(57) ABSTRACT

The present invention provides an aircraft passenger seat assembly that includes: (a) first and second seats selectively movable between upright and reclined positions and adapted for being positioned beside and at inwardly-facing angles relative to each other; (b) a center console having a relatively wide aft end and a relatively narrow forward end for being positioned between the first and second seats; and (c) the relatively wide aft end of the center console including first and second foot wells therein adapted to permit the feet of a passenger seated in an aft-positioned first or second seat to extend therein when the aft-positioned first or second seat is in the recline position.

17 Claims, 12 Drawing Sheets

U.S. PATENT DOCUMENTS

| | | |
|---|---|---|
| 7,025,306 B2 | 4/2006 | Saint Jalmes |
| 7,178,871 B1 | 2/2007 | Round et al. |
| 2001/0015566 A1 | 8/2001 | Park et al. |
| 2002/0017810 A1* | 2/2002 | Dryburgh et al. ...... 297/354.13 |
| 2003/0075962 A1* | 4/2003 | Saltzer et al. ................ 297/321 |
| 2003/0085597 A1* | 5/2003 | Ludeke et al. .......... 297/184.14 |
| 2003/0218095 A1* | 11/2003 | Saint Jalmes ............ 244/118.5 |
| 2004/0195451 A1* | 10/2004 | Bentley et al. ........... 244/118.6 |
| 2004/0232283 A1 | 11/2004 | Ferry et al. |
| 2007/0241232 A1* | 10/2007 | Thompson ............... 244/118.6 |

FOREIGN PATENT DOCUMENTS

| | | |
|---|---|---|
| EP | 1043225 A2 | 10/2000 |
| EP | 1044878 A2 | 10/2000 |
| FR | 647809 | 12/1928 |
| GB | 2362095 A | 11/2001 |
| WO | 2005014395 A1 | 2/2005 |

OTHER PUBLICATIONS 1999 press release of seat referred to as the Genesis seat, referenced in the letter from Jennifer Meredith.

2006 article referring to the Genesis seat, referenced in the letter from Jennifer Meredith.

Pages from the Nov. 1998 Component Maintenance Manual for the Genesis seat, referenced in the letter from Jennifer Meredith.

* cited by examiner

PASSENGER SEATING ARRANGEMENT

BACKGROUND OF THE INVENTION

This invention relates to passenger seating, and more particularly to an angled lounge seating arrangement.

Long-haul aircraft flights regularly fly non-stop to destinations 12-18 hours or more away from the origination point. At present, first class cabins provide various forms of "sleeper seats", meaning that the seat back reclines to the point where the seat occupant is able to attain a prone or nearly-prone position. In some cases the seats form a horizontal sleeping surface, and in other cases the head end of the reclined seat is raised to some degree above the foot end. The seats are generally parallel with the center line axis of the aircraft and traditionally forward facing in nature.

While such seats provide good passenger comfort, there are deficiencies in this arrangement. Because aircraft operating costs are directly linked to the physical size and attendant aerodynamic draft of the fuselage, it is desirable to make the cabin as small as possible. Prior art sleeper-type seats consume a large amount of space within the aircraft cabin.

Accordingly, there is a need for a passenger seat arrangement which provides a comfortable sleeping position to a passenger seated therein while minimizing the space consumed within an aircraft cabin.

BRIEF SUMMARY OF THE INVENTION

This need is addressed by the present invention, which provides an arrangement of sleeper seat units disposed in an angled configuration to allow for efficient telescoped placement thereof in an aircraft cabin.

According to one aspect, the present invention provides an aircraft passenger seat assembly that includes: (a) first and second seats selectively movable between upright and reclined positions and adapted for being positioned beside and at inwardly-facing angles relative to each other; (b) a center console having a relatively wide aft end and a relatively narrow forward end for being positioned between the first and second seats; and (c) the relatively wide aft end of the center console including first and second foot wells therein adapted to permit the feet of a passenger seated in an aft-positioned first or second seat to extend therein when the aft-positioned first or second seat is in the recline position.

According to another aspect of the present invention, the inwardly-facing angles of the first and second seat are oblique to a fore and aft longitudinal axis of an aircraft cabin.

According to another aspect of the present invention, the inwardly-facing angles of the first and second seat are between about 10 degrees and about 20 degrees.

According to another aspect of the present invention, the inwardly-facing angles of the first and second seat are between about 13 degrees and about 17 degrees.

According to another aspect of the present invention, the center console is generally triangularly-shaped.

According to another aspect of the present invention, the first and second seats each include a reclinable back rest and a forwardly-extendable foot rest.

According to another aspect of the present invention, the center console includes at least one aft-facing video monitor.

According to another aspect of the present invention, wherein the center console includes a pair of aft and outwardly-facing video monitors, a viewing surface of the pair of monitors being positioned normal to the inwardly-facing angle of a respective one of each of the first and second seats for viewing by a passenger in the respective one of the first and second seats.

According to another aspect of the present invention, the video monitors are positioned on the center console above the first and second foot wells.

According to another aspect of the present invention, the first and second foot wells each include an ottoman positioned therein for supporting the feet positioned in the foot well.

According to another aspect, the present invention provides aircraft seating for minimizing space occupied within an aircraft and being configurable to provide sleeping surfaces. The aircraft seating includes a first aircraft seat and a second aircraft seat that are each disposed at an angle with respect to a first longitudinal axis. Each of the aircraft seats includes a seat back, a seat bottom, a leg rest, and spaced-apart arm rests. A center unit is positioned between the aircraft seats. A recess is formed in the center unit for receiving the feet of passengers sitting behind the first and second aircraft seats. The foot well has support surfaces defined therein.

According to another aspect of the present invention, the first seat is positioned at a first angle relative to the first longitudinal axis and the second seat is positioned at a second angle relative to the first longitudinal axis.

According to another aspect of the present invention the first longitudinal axis is a longitudinal axis L of an aircraft.

According to another aspect of the present invention the first aircraft seat and the second aircraft seat are positioned to form a "V" shape.

According to another aspect of the present invention the first and second aircraft seats and the center unit are positioned in a first group such that a second, similar group can be positioned behind the first group such that the overall length of the two groups of seats is less than their length would be if the first and second seat units were positioned parallel to the first longitudinal axis.

According to another aspect of the present invention each of the first and second aircraft seats are configured to be movable between an upright configuration and a sleeping configuration.

According to another aspect of the present invention, when in the sleeping configuration, the support surfaces of each ottoman are aligned with a plane of the leg rest, a surface of the seat back, and a surface of the seat bottom.

According to another aspect of the present invention, each of the first and second aircraft seats is associated with a privacy shell.

According to another aspect of the present invention the privacy shell is configured such that an occupant of the associated aircraft seat can see over the privacy shell when the seat is in the upright configuration and is shielded from view when the seat is in the reclined configuration.

According to another aspect of the present invention a foot divider is positioned in the recess and defines a first foot well and a second foot well.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
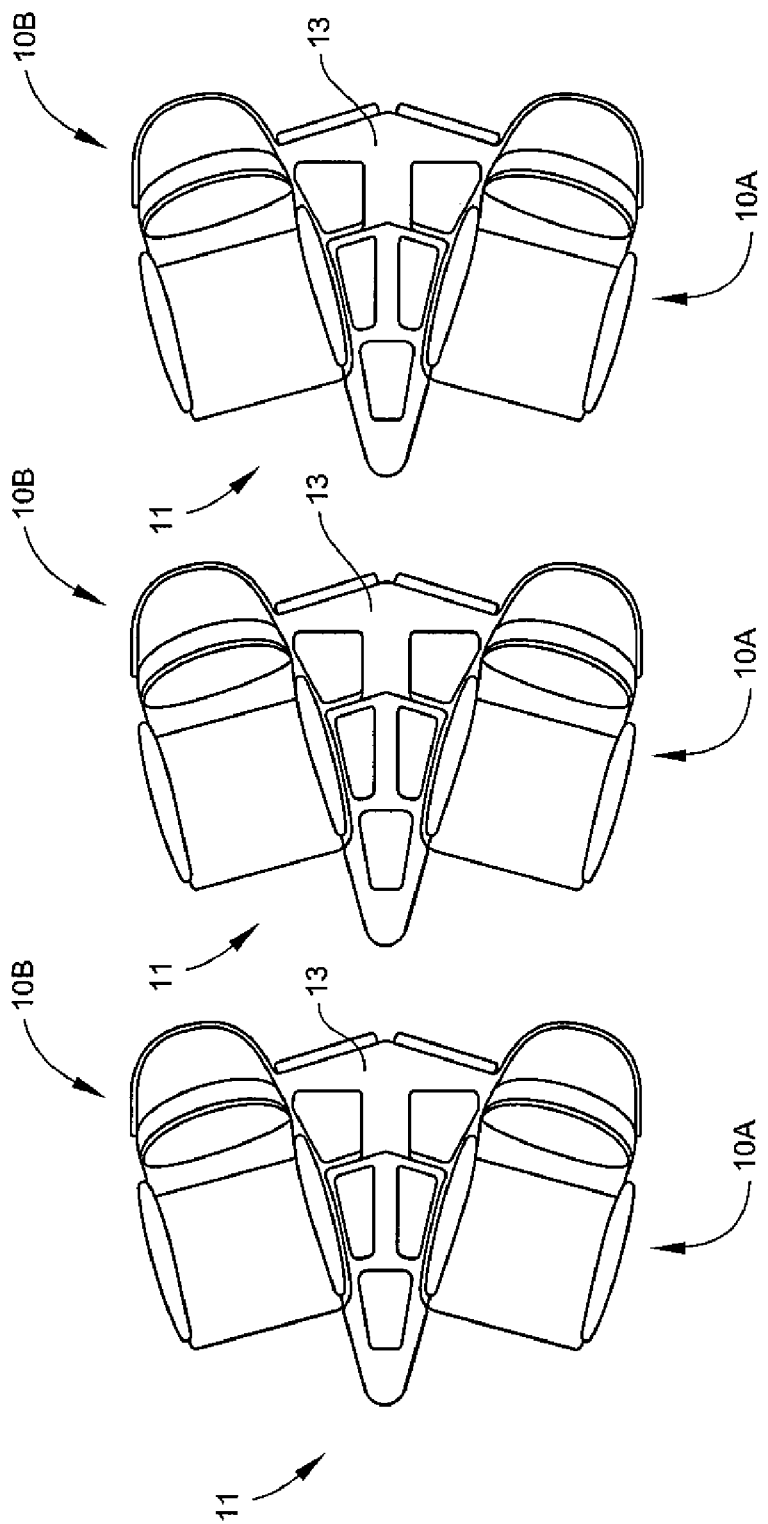
FIG. 1 is an overhead view of a group of passenger seats constructed according to the present invention.

Referring to the drawings wherein identical reference numerals denote the same elements throughout the various views, FIGS. 1-7 illustrate a group of passenger seat units 10 which are arranged in seat pairs 11 each having first and second mirror-image oriented seat units 10A and 10B with a center unit 13 disposed therebetween. The seat units 10 are substantially identical to each other, and include seat backs 12A, 12B (the upper portions of which define separate or integral headrests 14A, 14B) seat bottoms 16A, 16B, leg rests 18A, 18B, and spaced-apart arm rests 20, which may be movable between an "up" or "extended" position and a "down" or "retracted" position. The seat units 10 are supported by frames which are in turn mounted to the deck of the aircraft by track fittings of a known type.

Privacy shells 24 are provided which enclose the back and sides of the seat backs 12. The privacy shells 24 are configured to permit the occupant to see over and around the shells 24 when sitting upright, but to be shielded from view from the sides when in other positions.

The center unit 13 has a recess disposed in a central rear portion thereof which is sized to accommodate the feet of passengers seated in both seat units 10A and 10B of a given seat pair 11. A foot divider 30 is disposed in the recess and serves to keep the individual passenger's feet separate by forming two foot wells 26A and 26B. Ottomans 27A and 27B are positioned within foot wells 26A and 26B respectively and include elevated support surfaces 28A and 28B for receiving a passengers' feet in certain seating positions that are described in more detail below. Thus, the passengers in seat units 10A and 10B effectively share a space approximately equal to what would be allotted to one passenger in conventional arrangements, yet each passenger retains "ownership" of his or her portion of that space.

Each seat unit 10 is provided with appropriate movable components, actuators, and controls to enable a passenger seated therein to put the seat unit 10 into various configurations including an upright or "seated" configuration, a fully reclined "lie-flat" or "sleeping" configuration in which the seat unit 10 serves as a bed, and a number of intermediate configurations.

Figure 2:
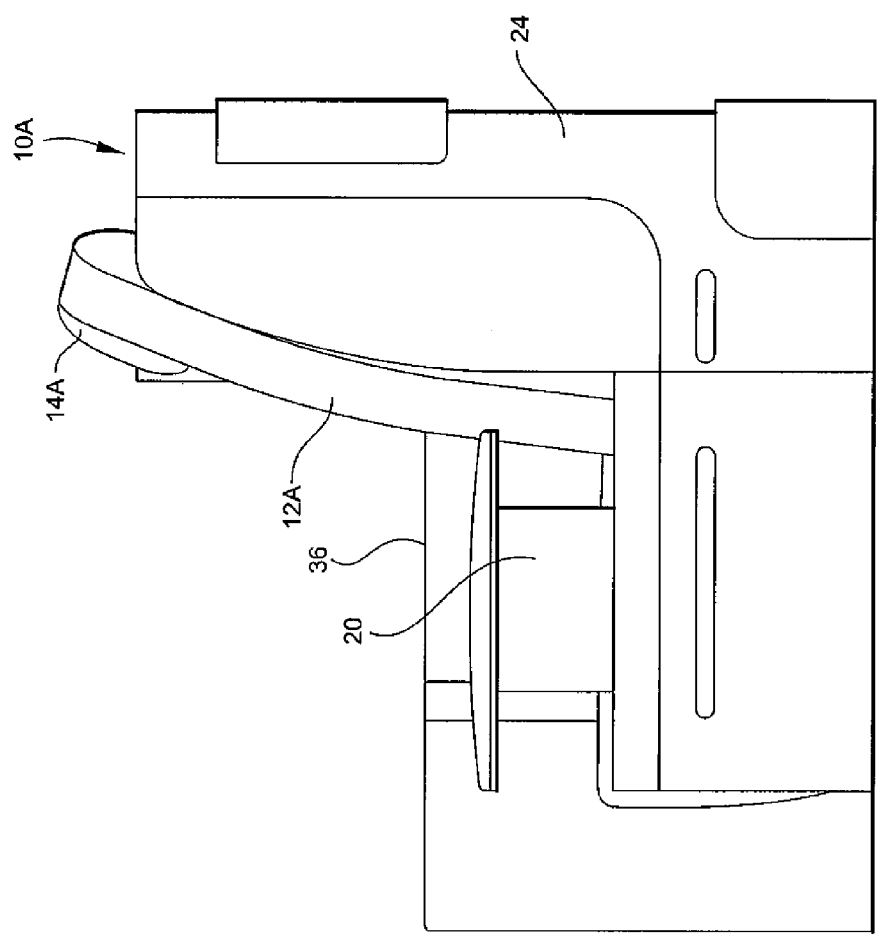
FIG. 2 is a side view of a pair of passenger seats constructed according to the present invention.
Figure 3:
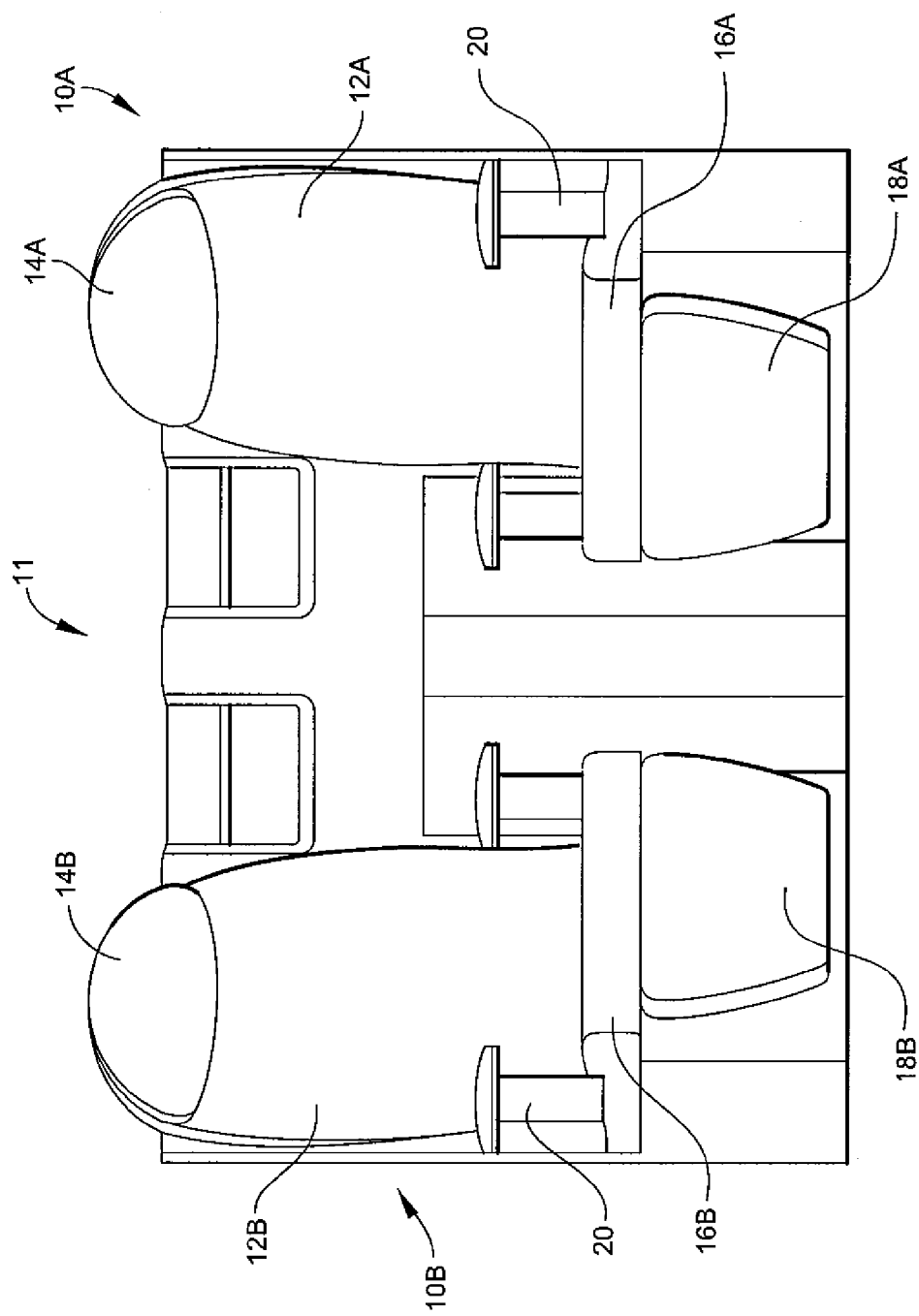
FIG. 3 is a front view of the seat pair of FIG. 2.
Figure 4:
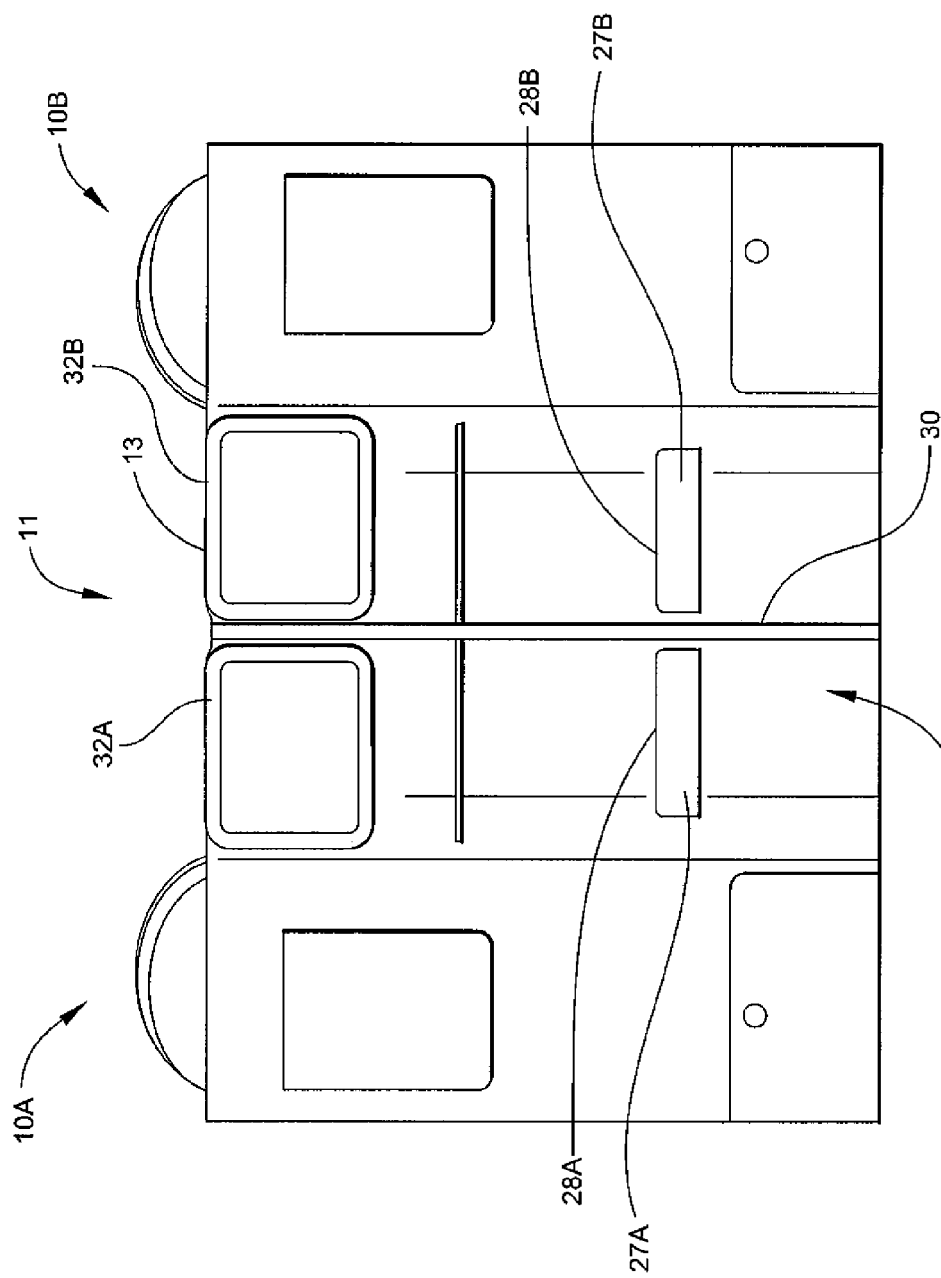
FIG. 4 is rear view of the seat pair of FIG. 2.
Figure 5:
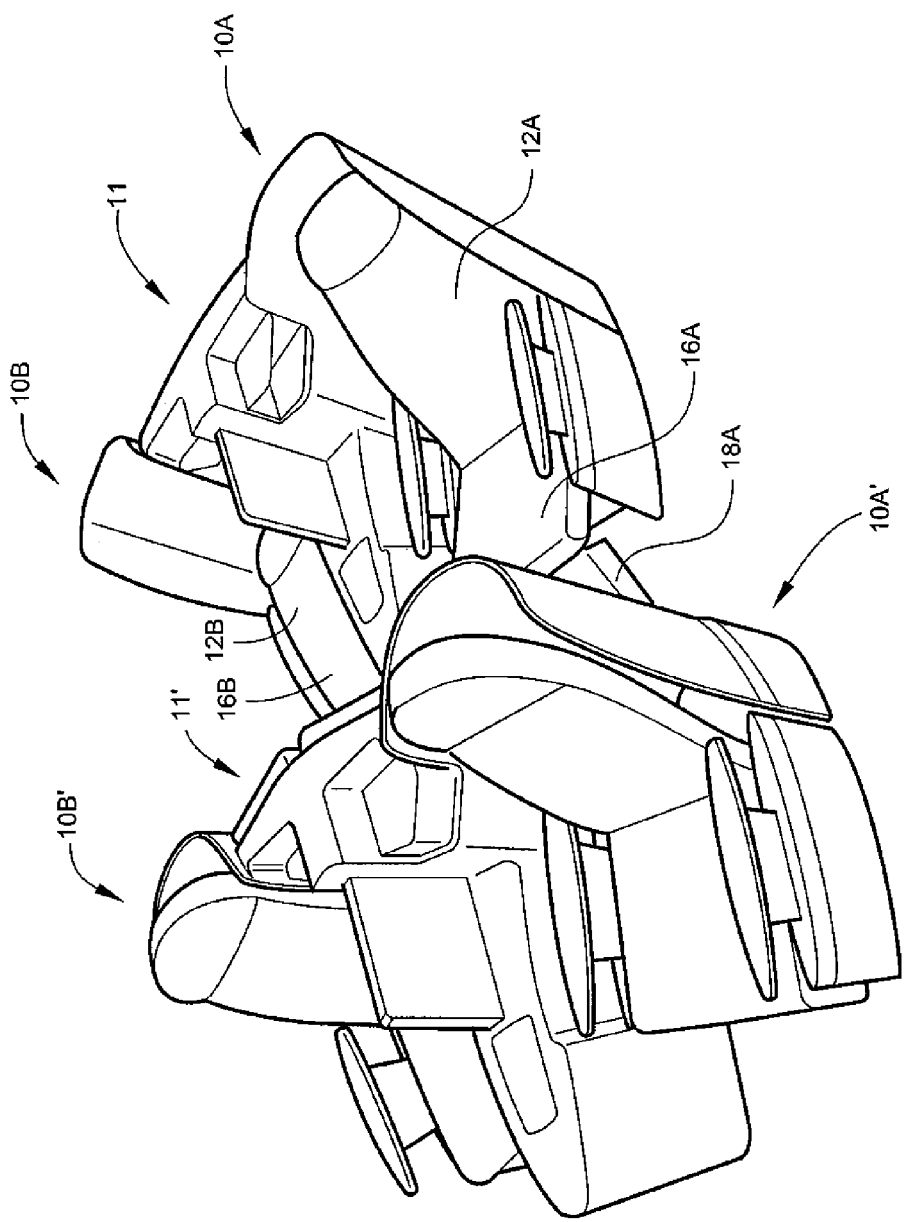
FIG. 5 is a perspective view of a grouping of passenger seats constructed according to the present invention.
Figure 6:
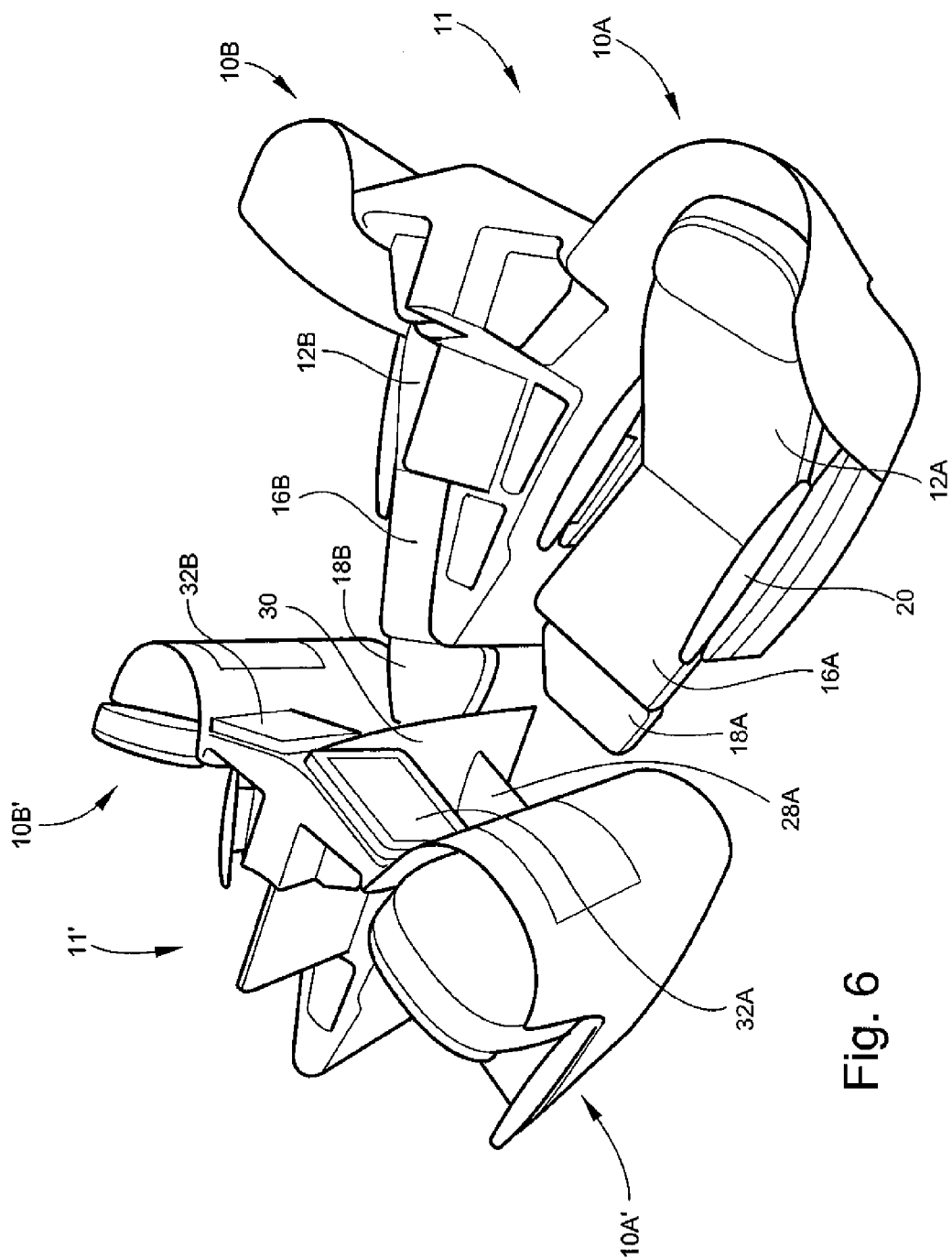
FIG. 6 is another perspective view of the passenger seat grouping of FIG. 5.
Figure 7:
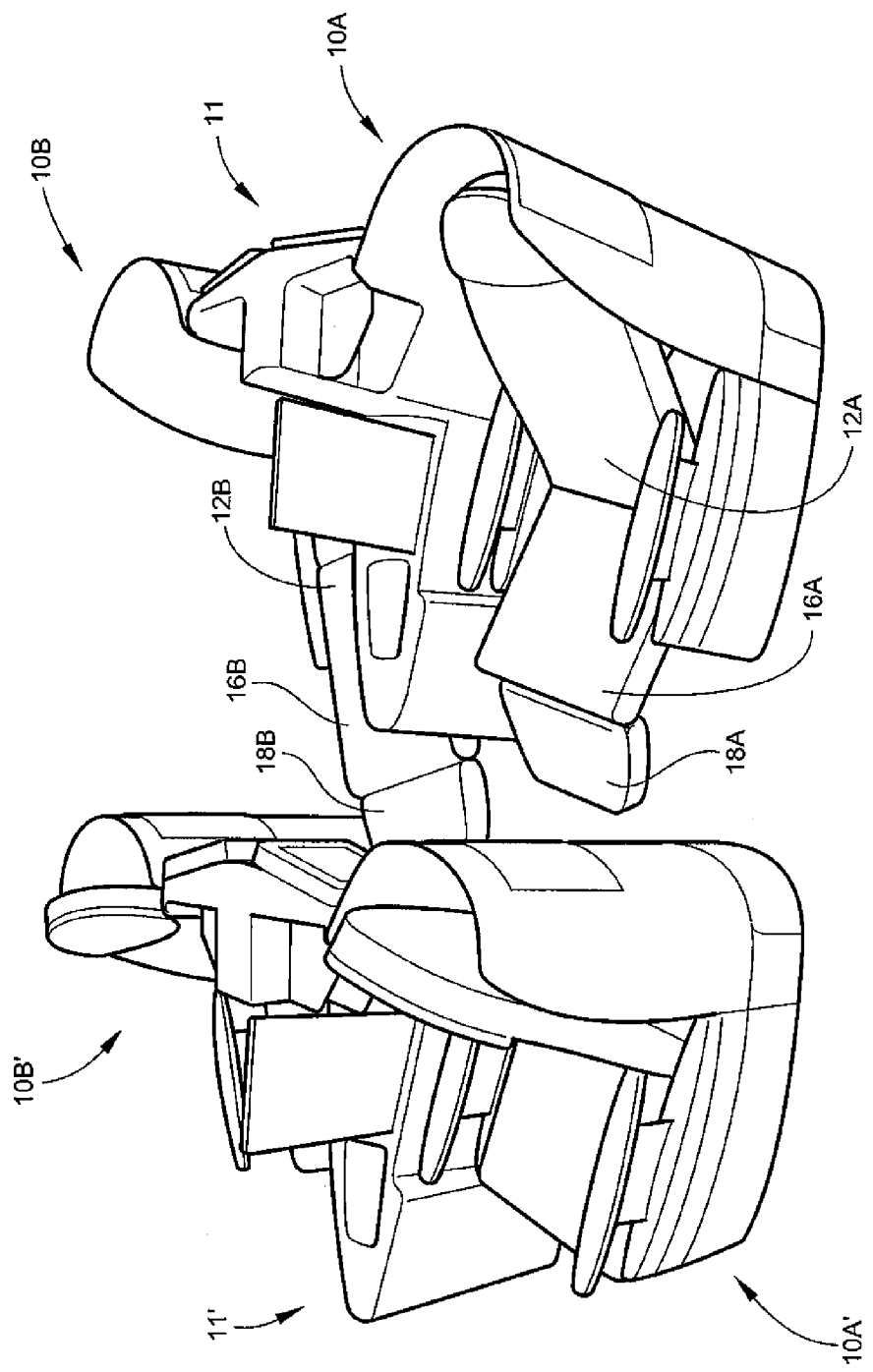
FIG. 7 is another perspective view of the passenger seat grouping of FIG. 5.

In FIGS. 1-3, seat units 10A and 10B are shown in the upright position for landing and takeoff, dining, working and video viewing. The leg rests are folded down, the seat bottoms 16A and 16B are generally horizontal and translated as far rearward as possible (in cases where they are movable), and the seat backs 12A and 12B are substantially upright.

In FIGS. 5-8, Seat unit 10A is shown in a partially reclined position, with the seat back 12A is angled rearward. In this position the occupant is supported along the entire body length in a comfortable semi-reclining position with the head elevated above the rest of the body and with the legs comfortably flexed at the knees. Seat unit 10B is shown in a fully reclined "lie-flat" or "sleeping" position. The occupant is permitted to fully recline with the head only very slightly above the remainder of the body. In this position, the support surface 28B is aligned with plane of the leg rest 18B, seat back 12B, and seat bottom 16B to collectively form a sleeping surface. Additional seat units 10A' and 10B', identical in construction to the seat units 10A and 10B, are shown in the upright position described above.

Figure 9:
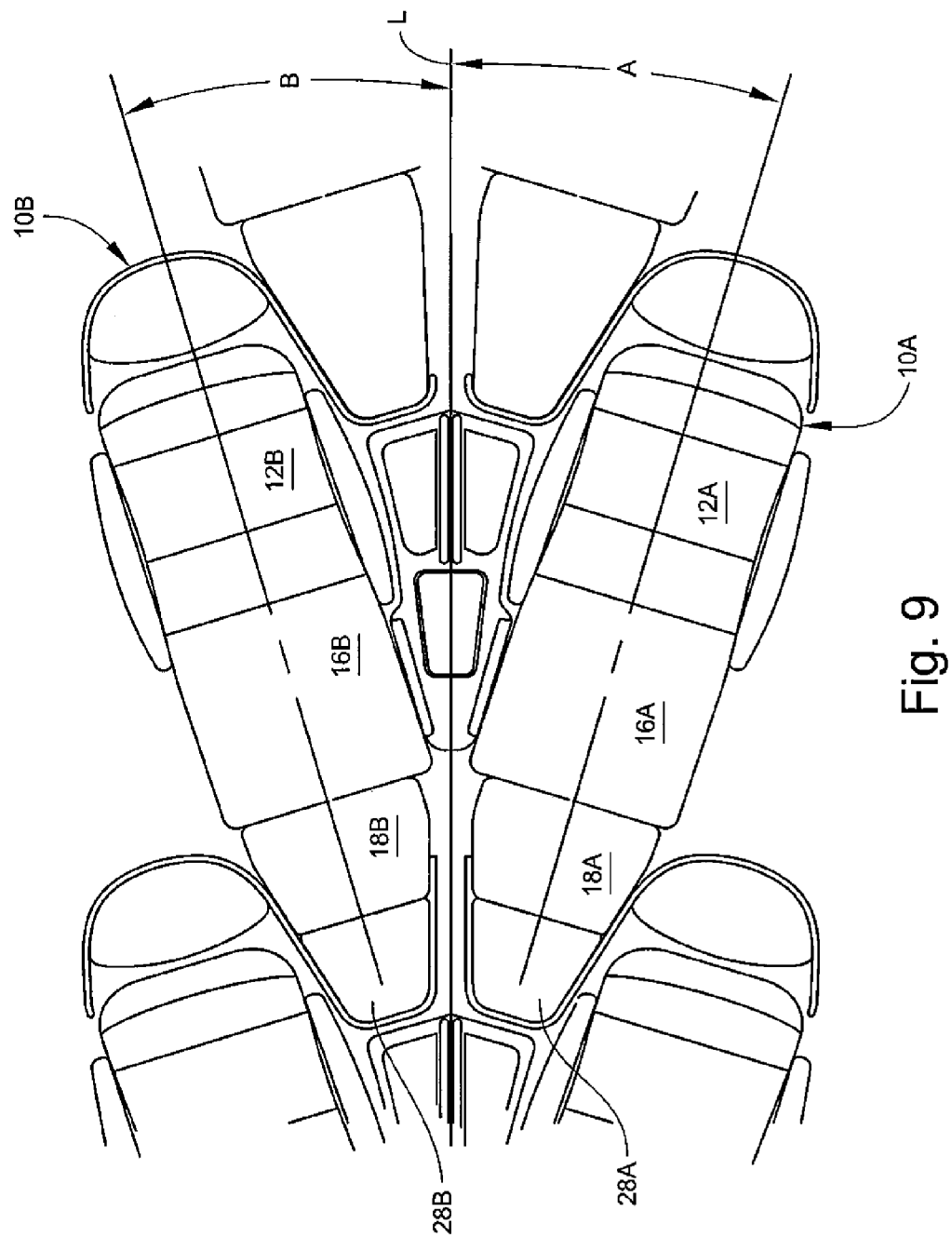
FIG. 9 is a fragmentary schematic plan view of the passenger seat grouping of FIG. 5.
Figure 10:
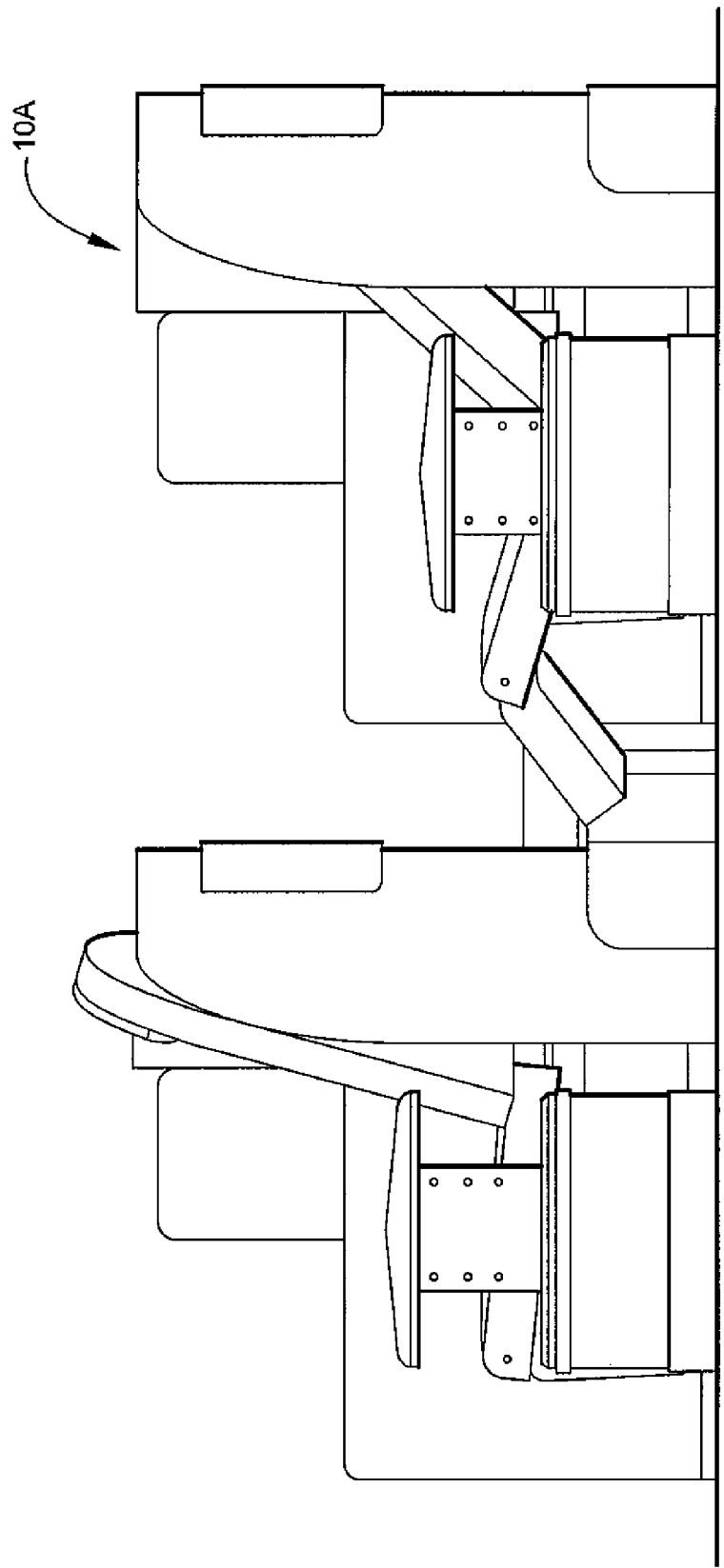
FIG. 10 is a schematic side of the passenger seat grouping of FIG. 5.
Figure 11:
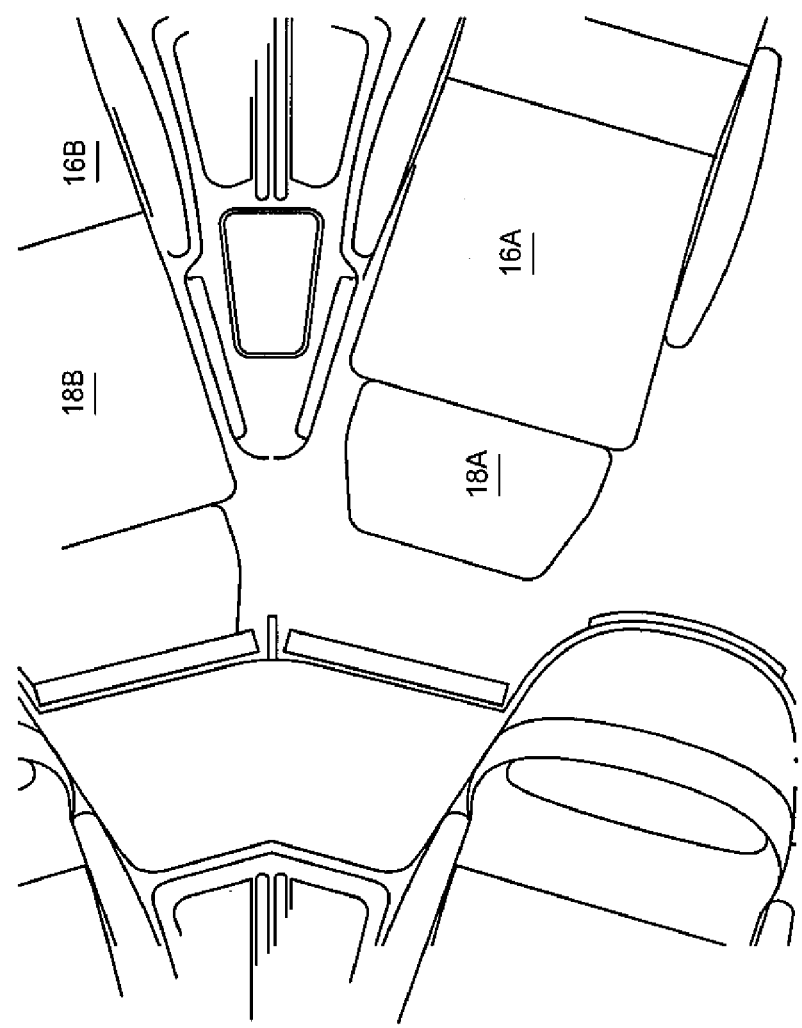
FIG. 11 is a fragmentary schematic plan view of a portion of the passenger seat grouping of FIG. 9.

As indicated above seat units 10 are arranged in seat pairs 11. Two seat pairs 11, denoted as a rear pair 11 and a front pair 11', are depicted in FIGS. 5-8. Each seat unit 10 is disposed at an angle with respect to the longitudinal axis "L" of the aircraft. This is best seen in FIGS. 9-11. The seat unit 10A is disposed at a first angle "A" while the seat unit 10B is disposed at an opposing second angle "B", to form essentially a "V" shape. The magnitudes of angles "A" and "B" may be equal or different. Preferably, angles "A" and "B" are generally equal and are between about 10 degrees and about 20 degrees. More preferably, angles "A" and "B" are between about 13 degrees and about 17 degrees. In the illustrated embodiment, angles "A" and "B" about 15 degrees. The effect of the angling is to "point" the passengers seated side-by-side in seat units 10A and 10B so that their feet share the foot well 26' of the forwardly-disposed center unit 13' and to offset the associated Ottomans 27A and 27B in a lateral direction, so they can be positioned in a side-by-side arrangement. The overall length consumed by the seat pairs 11 and 11' when "telescoped," or "nested," in this manner is less than the sum of their individual lengths.

Figure 8:
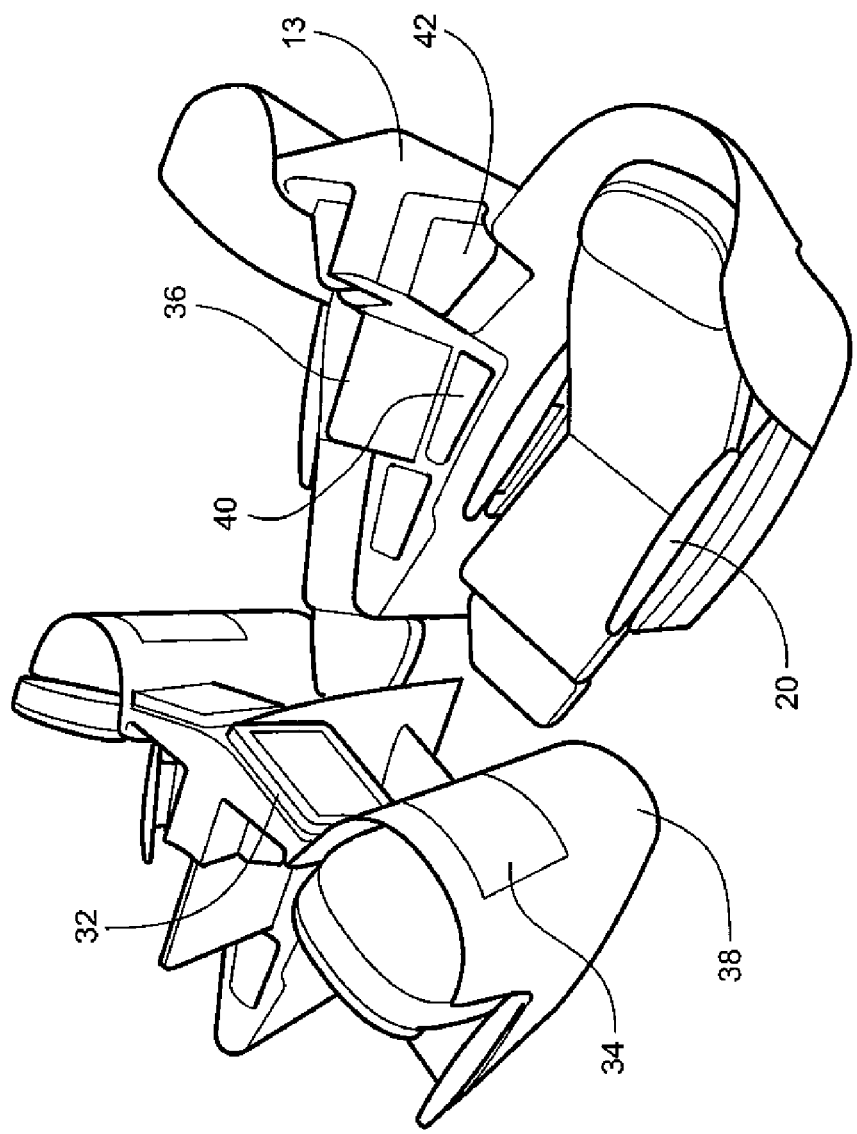
FIG. 8 is another perspective view of the passenger seat grouping of FIG. 5.

As shown in FIG. 8, the seat pairs 11 may include service features for the individual passengers such as television or video monitors 32; literature storage 34; a retractable privacy divider 36; additional forward and side storage spaces 38, 40, and 42; and the like. As shown in FIG. 2, in one embodiment, the retractable privacy divider 36 extends the length of the center console between the seat units 10A and 10B.

Figure 12:
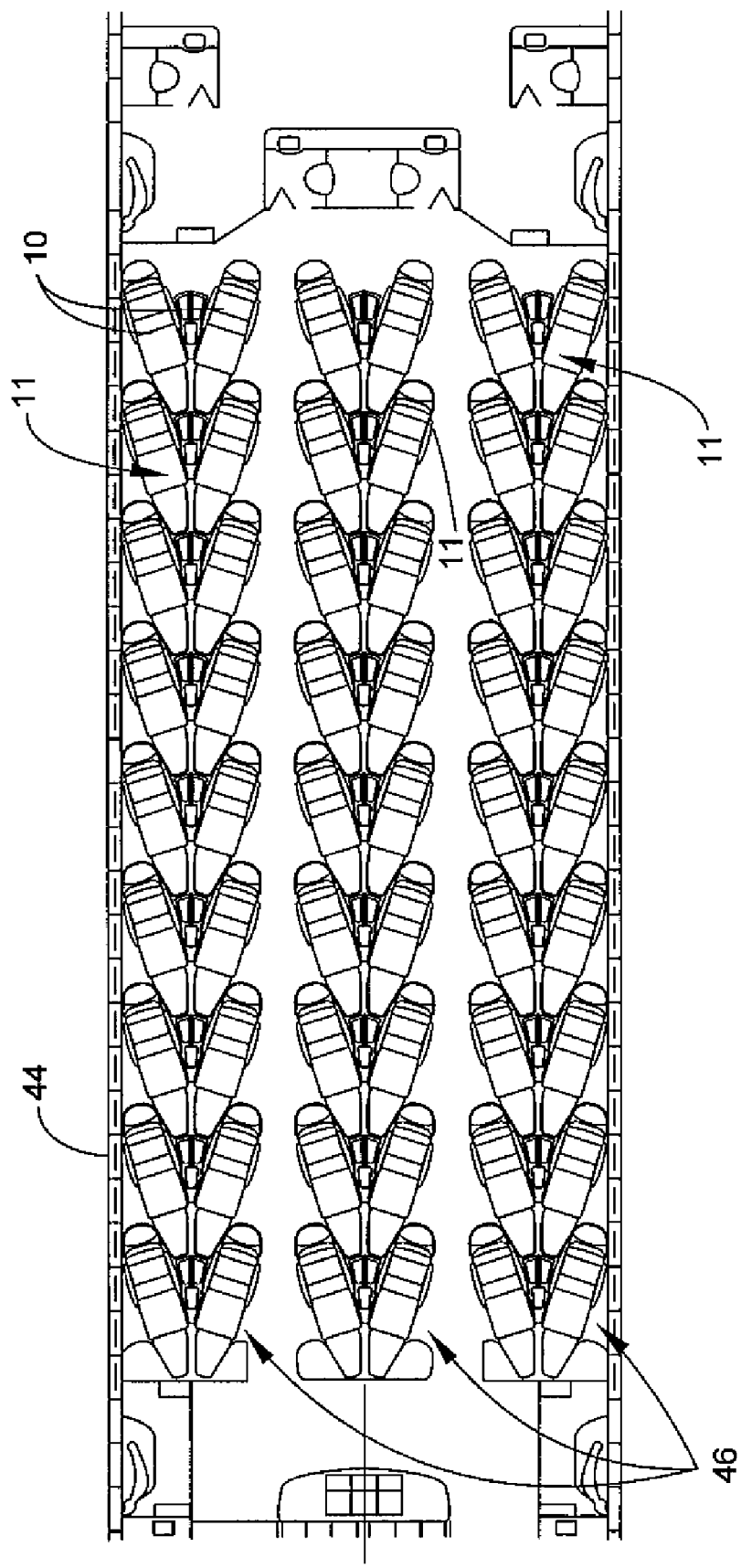
FIG. 12 is a top plan view of an exemplary cabin arrangement.

FIG. 12 illustrates a how the seat units 10 described above may be disposed in an aircraft cabin 44. In this arrangement, several of the seat pairs 11 are placed in telescoped columns 46 aligned with the longitudinal axis of the aircraft. Any number of these seat pairs 11 can be placed throughout the cabin 44 to make longer or shorter columns, and the columns 46 may be aligned at any angle desired relative to the aircraft's longitudinal axis (e.g. the columns 46 may be rear-facing). A number of different specific cabin arrangements are possible while incorporating the telescoped V-shaped configuration described above and these arrangements are equally applicable to other types of vehicles besides aircraft.

The seat units 10 are uniquely configured so as to maximize usage of space within the cabin of the aircraft, to promote a sense of privacy of passengers, and to facilitate conversation between two passengers in a seat pair 11. In this regard, the telescoped configuration reduces the overall length required for a given number of seat pairs 11 positioned in rows. The inward angle of each seat unit 10 in a seat pair 11 promotes privacy by positioning passengers such that their line of sight is directed away from passengers seated in adjacent seat pairs 11. This arrangement can also promote conversation between passengers seated within a seat pair 11 by positioning them in a more conventional conversational pose, i.e. generally directed toward each other. When conversation is not desired, a passenger within the seat unit 10A of a seat pair 11 can utilize retractable privacy divider 36 to separate themselves from a passenger in the seat unit 10B.

The foregoing has described a passenger seating arrangement having telescoped seat pairs. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. An aircraft passenger seat assembly, comprising:
   (a) first and second seats positioned in fixed lateral alignment and at inwardly-facing angles relative to each other, including first and second seat bottoms, and respective first and second seat backs that are selectively movable between upright and rearwardly-extended lie-flat positions;
   (b) first and second stationary privacy shells positioned aft of respective first and second seat backs, the privacy shells being rearwardly spaced-apart from the first and second seat backs to accommodate the first and second seat backs in the lie-flat position, and defining an intermediate space therebetween;
   (c) a center convenience unit having a wide aft end and a narrow forward end positioned in the intermediate space between the the first and second privacy shells, the narrow forward end defining a terminus that is at all times spaced-apart from a like privacy shell of like first and second seats positioned forwardly of the first and second seats for providing passage space between the first and second seats and like privacy shells of forwardly-positioned like first and second seats;
   (d) the wide aft end of the center convenience unit positioned between the first and second privacy shells and forward of a rearwardmost extent of the first and second privacy shells, and including first and second foot wells therein adapted to permit the feet of a passenger seated in an aft-positioned like first or second seat physically separated from the first and second seats to extend therein when the aft-positioned first or second seat is in the lie-flat position; and
   (e) first and second leg rests mounted on respective ones of the first and second seats, and selectively-moveable between a retracted position beneath the seat bottoms, and an extended position forward of the seat bottoms bridging the passage space between the first and second seat bottoms and the respective first and second foot wells to provide a continuous lie-flat seat surface from the foot wells to the seat backs when in the lie-flat position.

2. An aircraft passenger seat assembly according to claim 1, wherein the inwardly-facing angles of the first and second seat are oblique to a fore and aft longitudinal axis of an aircraft cabin.

3. An aircraft passenger seat assembly according to claim 2, wherein the inwardly facing angles of the first and second seat are between 10 degrees and 20 degrees.

4. An aircraft passenger seat assembly according to claim 3, wherein the inwardly facing angles of the first and second seat are between 13 degrees and 17 degrees.

5. An aircraft passenger seat assembly according to claim 1, wherein the center convenience unit is generally triangularly-shaped.

6. An aircraft passenger seat assembly according to claim 1, wherein the first and second foot wells comprise respective ottomans.

7. An aircraft passenger seat assembly according to claim 1, wherein the first and second privacy shells each include at least one aft-facing video monitor for viewing by a passenger seated aft of the privacy shell.

8. An aircraft passenger seat assembly according to claim 1, wherein each privacy shell includes an outwardly-facing video monitor, a viewing surface of the monitor being positioned normal to the inwardly-facing angle of a respective one of each of the first and second seats for viewing by a passenger seated aft of the privacy shell.

9. An aircraft passenger seat assembly according to claim 1, wherein the video monitors are positioned on the first and second privacy shells above respective first and second foot wells.

10. An aircraft passenger seat assembly according to claim 1, wherein an aft end of the center convenience unit defines a convex shape having two planar surfaces, and the first and second privacy shells each extend rearwardly beyond the rearward-most extent of the center convenience unit.

11. An aircraft passenger seat assembly, comprising:
    (a) first and second seats positioned in fixed lateral alignment and at inwardly-facing angles relative to each other, including respective first and second seat bottoms, and first and second seat backs that are selectively movable between upright and lie-flat positions;
    (b) third and fourth seats positioned in lateral alignment and at inwardly-facing angles relative to each other, including respective first and second seat bottoms, and first and second seat backs that are selectively movable between upright and lie-flat positions, and positioned aft of the first and second seats;
    (c) first and second stationary privacy shells positioned aft of respective first and second seat backs;
    (d) third and fourth stationary privacy shells positioned aft of respective third and fourth seat backs, the third and fourth privacy shells being rearwardly spaced-apart from the third and fourth seat backs to accommodate the third and fourth seat backs in the lie-flat position;
    (e) a first center convenience unit having a wide aft end and a narrow forward end defining a generally triangular shape and positioned in an intermediate space between the first and second seats and the first and second privacy shells, and physically separate from the third and fourth seats;
    (f) a second center convenience unit having a relatively wide aft end and a relatively narrow forward end positioned in an intermediate space between the third and fourth seats and the respective third and fourth privacy shells, the narrow forward end of the second center convenience unit defining a terminus that is at all times spaced-apart from the first and second privacy shells to provide passage space between the third and fourth seats and the first and second privacy shells of the first and second seats;
    (g) the aft end of the first center convenience unit positioned between the first and second privacy shells, a rearward most extent of the aft end of the first convenience unit being forward of the rearward most extent of the first and second privacy shells, the aft end of the first convenience center including respective first and second foot wells therein physically separate from the third and fourth seats and adapted to permit the feet of passengers seated in the third and fourth seats to extend therein when the third and fourth seats are in the lie-flat position; and (h) first and second leg rests mounted on respective ones of the first and second seats and third and fourth leg rests mounted on respective ones of the third and fourth seats and selectively-moveable between a retracted position beneath respective seat bottoms, and an extended position forward of the respective seat bottoms bridging the passage space between the seat bottoms and the respective foot wells to provide a continuous lie-flat seat surface from the foot wells to the seat backs when in the lie-flat position.

12. An aircraft passenger seat assembly according to claim 11, wherein the first seat is positioned at a first angle relative to a longitudinal axis of the aircraft, and the second seat is positioned at a second angle relative to the longitudinal axis.

13. An aircraft passenger seat assembly according to claim 11, wherein the first and second seats and the first center convenience unit are positioned in a first group, and the third and fourth seats and the second center convenience unit are positioned in a second group behind the first group.

14. An aircraft passenger seat assembly according to claim 13, wherein the first and third seats define respective longitudinally-extending parallel axes, and the second and fourth seats define respective longitudinally-extending parallel axes that are not parallel to the longitudinally-extending parallel axes of the first and third seats.

15. An aircraft passenger seat assembly according to claim 11, wherein the first and second convenience units each include a privacy divider positioned between respective first and second, and third and fourth seats, for providing a visual barrier between seat occupants in the first and second seats, and seat occupants in the third and fourth seats.

16. An aircraft passenger seat assembly according to claim 11, and wherein the first and second convenience units each include a privacy divider positioned between respective first and second, and third and fourth seats, and selectively movable between a raised position for providing a visual barrier between seat occupants in the first and second seats, and seat occupants in the third and fourth seats, and a lowered position for providing visual communication between seat occupants in the first and second seats, and seat occupants in the third and fourth seats.

17. An aircraft passenger seat assembly according to claim 11, and comprising a plurality of ranks and files of first and second seats, and third and fourth seats, collectively defining an aircraft cabin seating arrangement.

* * * * *